US005590566A

United States Patent [19]
Joerg et al.

[11] Patent Number: 5,590,566
[45] Date of Patent: Jan. 7, 1997

[54] SERVO-ASSISTED RACK-AND-PINION STEERING SYSTEM

[75] Inventors: Wolfgang Joerg; Bernd Langkamp, both of Stuttgart, Germany

[73] Assignee: Mercedes-Benz AG, Stuttgart, Germany

[21] Appl. No.: 495,992

[22] Filed: Jun. 28, 1995

[30] Foreign Application Priority Data

Jun. 28, 1994 [DE] Germany .......................... 44 22 556.3

[51] Int. Cl.[6] .............................. B62D 5/09; B62D 3/12; B62D 5/22

[52] U.S. Cl. ................................ 74/498; 74/500; 74/496; 180/427; 180/428

[58] Field of Search ............................ 74/498, 500, 496; 180/426, 427, 428

[56] References Cited

U.S. PATENT DOCUMENTS

| | | | |
|---|---|---|---|
| 4,142,448 | 3/1979 | Erwin | 74/498 |
| 4,146,244 | 3/1979 | Presley | 74/498 |
| 4,524,631 | 6/1985 | Cordiano | 180/428 |
| 4,794,809 | 1/1989 | Kobayashi et al. | 74/498 |
| 4,924,696 | 5/1990 | Schroeder et al. | 180/428 |
| 5,529,137 | 6/1996 | Lang | 180/428 |

FOREIGN PATENT DOCUMENTS

| | | |
|---|---|---|
| 0192641 | 1/1988 | European Pat. Off. . |
| 3043968 | 6/1981 | Germany . |
| 4126020 | 2/1993 | Germany . |
| 4203335 | 8/1993 | Germany . |

*Primary Examiner*—Charles A. Marmor
*Assistant Examiner*—David M. Fenstermacher
*Attorney, Agent, or Firm*—Evenson, McKeown, Edwards & Lenahan, P.L.L.C.

[57] ABSTRACT

A servo-assisted rack-and-pinion steering system has a helical-toothed rack and a helical-toothed pinion cooperating therewith. On the transmission of forces between the pinion and the rack, a torque relative to the longitudinal axis of the rack acts on the rack. The resulting rotation of the rack is utilized to control the servomotor via a lever arrangement.

7 Claims, 3 Drawing Sheets

SERVO-ASSISTED RACK-AND-PINION STEERING SYSTEM

BACKGROUND AND SUMMARY OF THE INVENTION

The invention relates to a servo-assisted rack-and-pinion steering system having a helical-toothed rack and a helical-toothed pinion cooperating therewith.

A rack-and-pinion steering system is known, for example, from German Patent document DE 41 26 020 A1. The helical toothing of the rack serves, on the one hand, to ensure that the transmission of forces between the pinion and the rack is jerk free. On the other hand, the forces occurring between the toothings are utilized for displacing the pinion, which is axially mounted in a resilient manner, in one direction or the other in dependence on the direction of rotation. This displacement is then utilized to control a servo valve arrangement for a hydraulic servomotor assisting the steering system. A basically similar arrangement is the subject of EP 01 92 641 B1.

In rack-and-pinion steering systems of the type indicated above, it is known from German Patent document DE 42 03 335 A1 to mount the pinion so as to be swivellable. The side of the pinion which is connected to the steering shaft is mounted in a fixed bearing and the other side is mounted in a floating bearing. When the forces are transmitted between the pinion and the rack, the swivelling movement of the pinion in one direction or the other, which occurs through constraint, is here then utilized to control servo valves of a hydraulic servomotor.

In principle, the servo valves can also be controlled if the pinion has a fixed axial and radial mounting.

It is, for example, known from German Patent document DE 30 43 968 C2 to construct the steering shaft with parts which are capable of limited rotation relative to one another. The relative rotation of these parts is used to control the valves.

In the case of mass produced motor vehicles, the steering shaft parts rotatable relative to one another often form a rotary slide valve by which the hydraulic servomotor can be controlled.

There is therefore needed a form of servomotor control which is particularly suitable for rack-and-pinion steering systems.

According to the present invention, this need is met in that rotary movements of the rack, which is capable of limited rotation relative to its longitudinal axis, serve to actuate control elements of the servomotor.

The present invention is based on the realization that, in the transmission of forces between the pinion and the rack, a torque is exerted on the rack because of the helical toothing. The direction of the torque is dependent on the direction of rotation of the pinion.

This rotary movement of the rack is unavoidable in rack-and-pinion steering systems because, to avoid toothing play, the rack is resiliently pressed against the pinion and, accordingly, can also yield by rotation to the pressure applied by spring action.

For the purpose of implementing the present invention, it is thus possible to use basically unchanged designed conventionally rack-and-pinion steering systems. It simply is necessary for elements to be provided which are moved by or together with the rack and which make a movement stroke analogous to the rotary movement of the rack.

According to a preferred embodiment of the present invention, a lever is provided which is coupled to the rack and is arranged radially in relation to the rack and which swivels in correspondence with the rotation of the rack.

The arrangement is preferably such that the lever is able to be displaced, relative to the rack, in the longitudinal direction of the rack and, accordingly, does not need to participate in the displacement movements of the rack.

A particular advantage of the present invention is that the rack is able to make comparatively pronounced swivelling movements, so that the servomotor can, without difficulty, be controlled by long adjustment strokes.

Other objects, advantages and novel features of the present invention will become apparent from the following detailed description of the invention when considered in conjunction with the accompanying drawings.

DETAILED DESCRIPTION OF THE DRAWINGS

Figure 1:
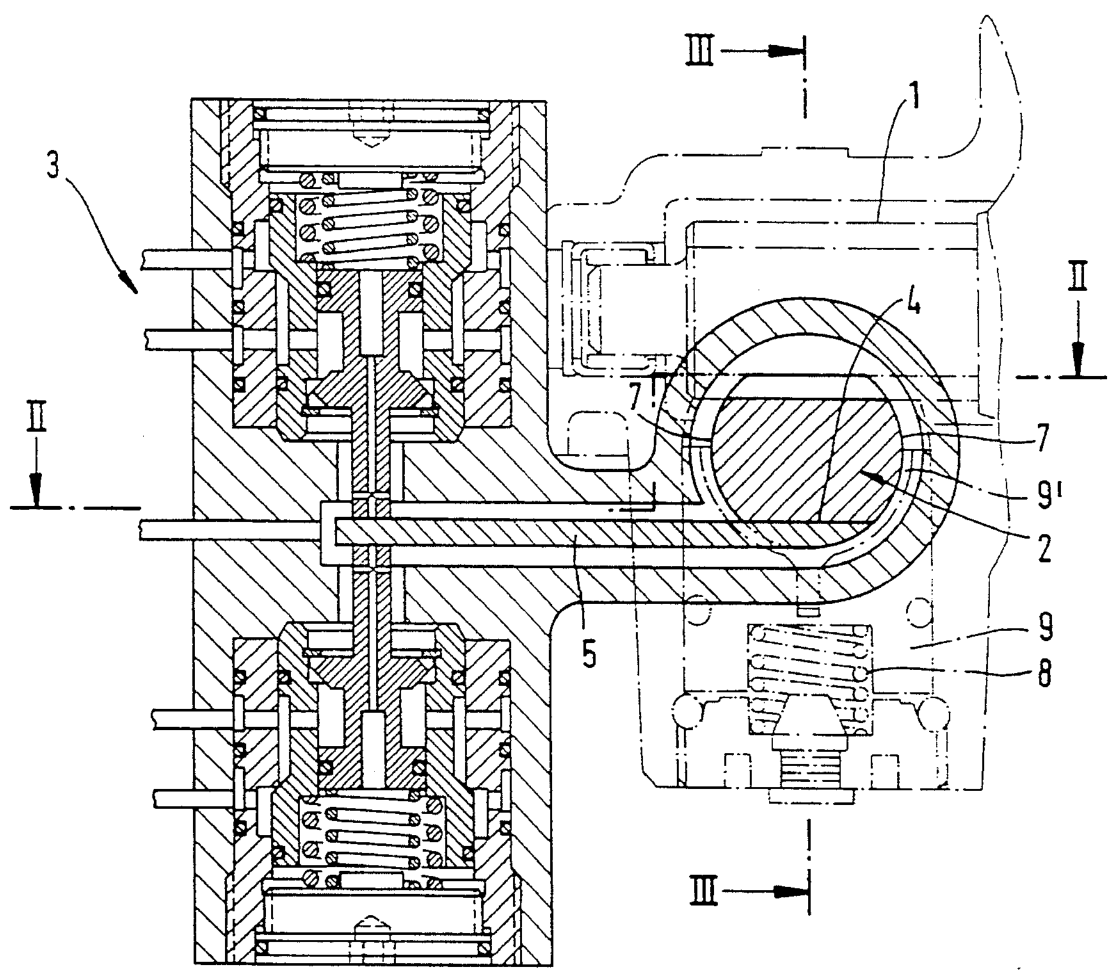
FIG. 1 is a sectional representation of the rack-and-pinion steering system according to the present invention, the sectional plane lying transversely to the longitudinal axis of the rack which extends into the page of the figure.

In a vehicle steering system, a pinion 1, which is actuated by a steering wheel (not shown) with the aid of a steering shaft (not shown), cooperates with a rack 2. The pinion 1 and the rack 2 have helical toothings matching one another. A torque of greater or lesser magnitude thus acts on the rack 2 when forces are transmitted between the pinion 1 and the rack 2 due to the constricted engagement between the rack 2 and pinion 1. The direction of the torque depends here on the direction of rotation of the pinion 1 or on the direction of displacement of the rack 2.

According to the present invention, provision is now made for the rack 2 to be arranged for limited rotation relative to its longitudinal axis. This makes it possible for a servo valve arrangement 3 or other control elements for a servomotor, to be actuated, through the rotary movement of the rack 2, in such a manner that the actuating force required on the steering wheel is reduced.

To achieve a driving coupling between the rack 2 and the servo valve arrangement 3, the rack 2 has, on its side opposite the toothing, a plane force transmission surface 4 which extends in the longitudinal direction of the rack 2 and on which the mating surface of a swivel lever 5, which is arranged for swivelling about the longitudinal axis of the rack 2, lies in sliding contact.

Figure 2:
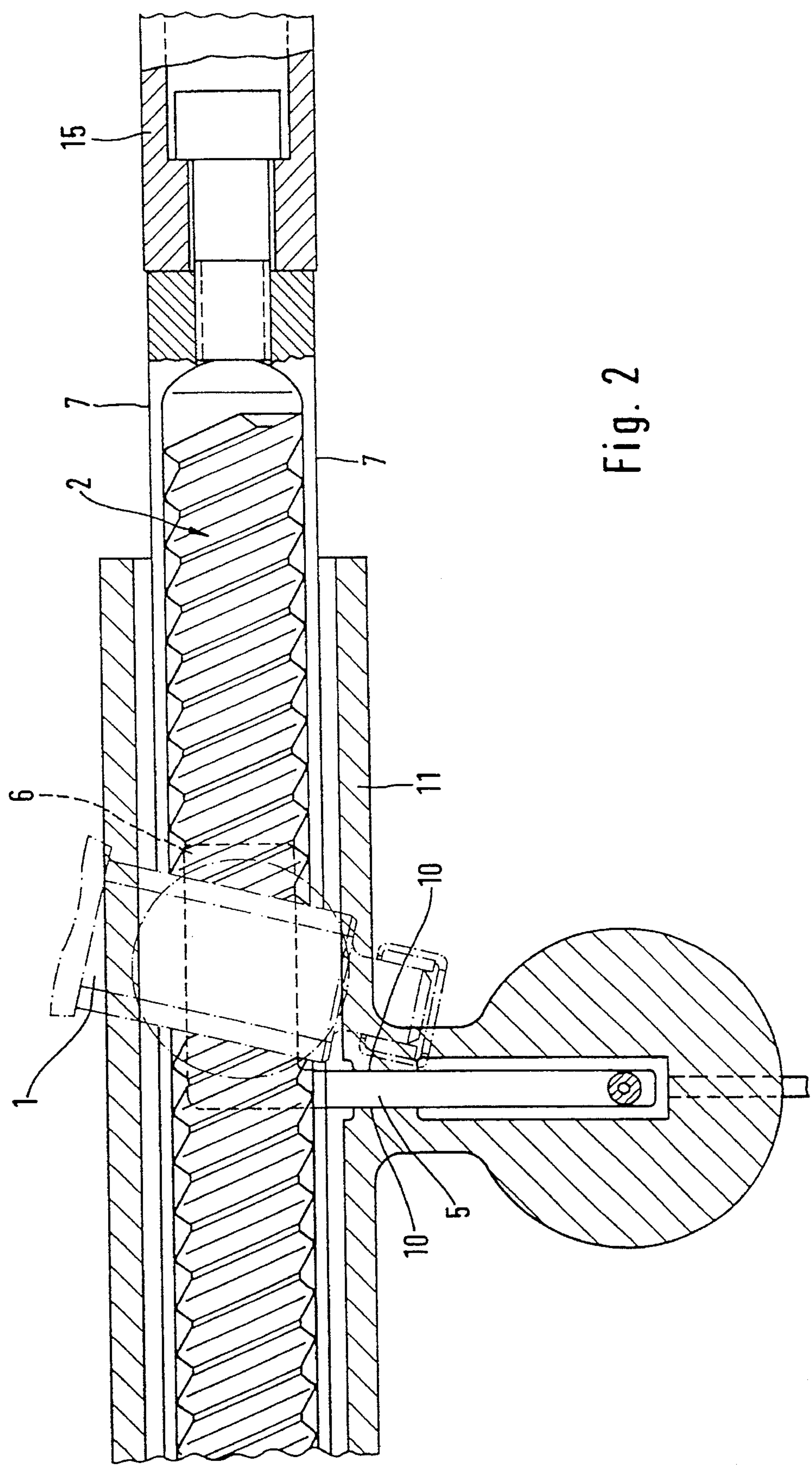
FIG. 2 is a sectional representation taken along the sectional line II—II in FIG. 1.

In a plan view towards the toothing side of the rack 2 as shown in FIG. 2, the lever 5 is arranged at the side of the pinion 1. The lever 5 has a lateral extension which lies on the force transmission surface 4 of the rack 2. The lateral extension 6 extends into the region of the rack 2 which is beneath the pinion 1. The cross-section of the extension 6 is in the form of a segment of a circle which is continued by the side flanks 7 (see FIG. 1). The profile of the side flanks have the shape of an arc of a circle of the rack 2.

Figure 3:
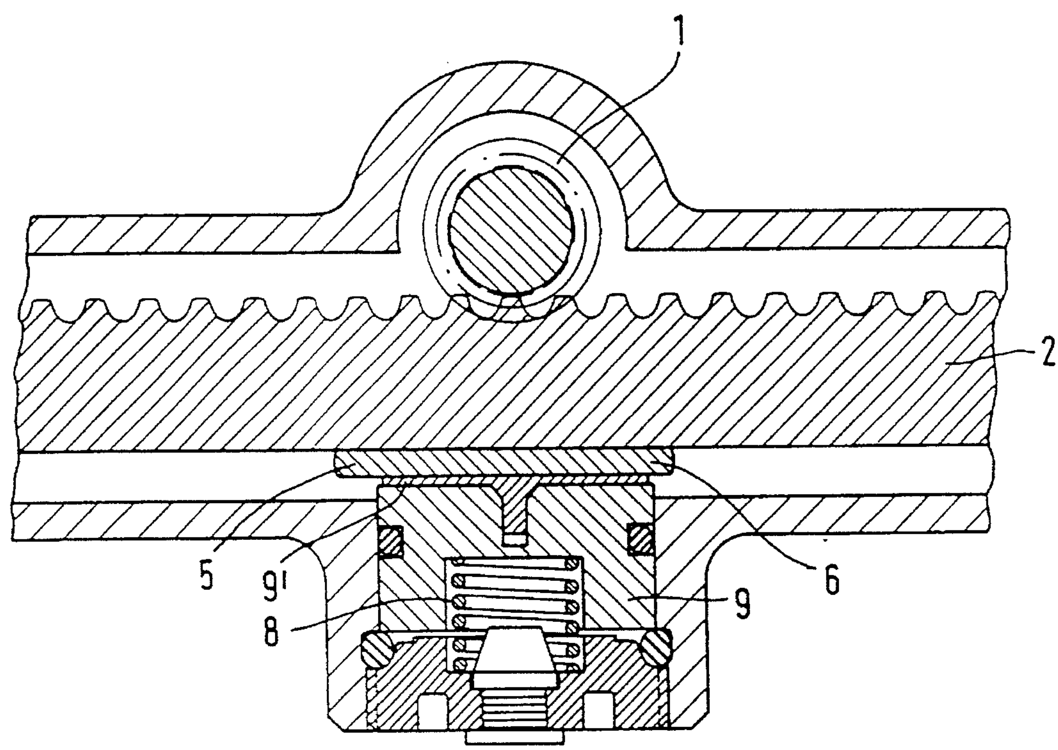
FIG. 3 is a sectional representation taken along the sectional line III—III in FIG. 1.

A push piston 9 is arranged on the side of the rack 2 opposite the pinion 1 as shown in FIG. 3. The push piston 9 is urged in the direction of the rack 2 by a helical compression spring 8. On the push piston's end face facing the rack 2, a concave bearing bed 9' having an approximately semicircular cross-section is provided for the purpose of receiving the rack 2 and the extension 6. The cross-section of the bearing bed 9' accordingly has a shape matching the cross-section of the rack 2 and extension 6.

On the one hand, the push piston 9 thus continuously holds the extension 6 of the lever 5 against the force transmission surface 4 of the rack 2 so that the extension 6, and consequently the swivel lever 5, follow rotational movements of the rack 2 relative to the longitudinal axis of the rack. On the other hand, the rack 2 is pushed against the pinion 1 by the push piston 9, so that no toothing play whatsoever can occur.

In order to hold the lever 5 stationary in the axial direction of the rack 2, the lever 5 is slidably guided between two guide surfaces 10 as shown in FIG. 2. The guide surfaces 10 are arranged, parallel to a radial plane of the rack 2, on a casing 11 containing the rack 2 and also the push piston 9. This casing 11 may also contain the servo valve arrangement 3.

At its ends, the rack 2 is expediently extended by end pieces 15 in such a manner that no noteworthy torques whatsoever, relative to the rack axis, can be transmitted between the end pieces 15 and the rack 2. The end pieces 15 are connected to the rack 2 for easy-running rotation, while, however, the connection is, as far as possible, free from play in the axial direction. Moreover, the end pieces 15 are expediently slidably guided in separate guides (not shown).

Through the use of the end pieces 15, the rack 2 can be connected in basically any desired manner to linkage parts or the like, such as the track rods, of a motor vehicle steering system. Because of the easily rotatable connection between the end pieces 15 and the rack 2, no torques whatsoever can be exerted on the rack 2, relative to its longitudinal axis, by these linkage parts. Any rotary movements of the rack 2 are thus caused exclusively by forces which are to be transmitted between the pinion 1 and the rack 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A rack-and pinion steering system assisted by a servomotor, comprising:

a helical-toothed rack;

a helical-toothed pinion cooperating with said helical-toothed rack;

wherein said rack is arranged for limited rotation relative to its longitudinal axis and turns in one direction or the other in dependence on a direction of force transmitted between said pinion and said rack; and a control arrangement for controlling the servomotor of the rack-and-pinion steering system, wherein said limited rotation of said rack relative to its longitudinal axis actuates said control arrangement.

2. A rack-and-pinion steering system according to claim 1, further comprising a lever coupled to said rack in a substantially non-rotatable manner relative to the longitudinal axis of said rack.

3. A rack-and-pinion steering system according to claim 2, further comprising:

a push element for pressing said rack against said pinion;

wherein said lever has a plane surface which is pressed against a further plane surface on said rack by said push element, said further plane surface being arranged on an opposite side of the toothing of the rack.

4. A rack-and-pinion steering system assisted by a servomotor, comprising:

a helical-toothed rack;

a helical-toothed pinion cooperating with said helical-toothed rack;

wherein said rack is arranged for limited rotation relative to its longitudinal axis and turns in one direction or the other in dependence on a direction of force transmitted between said pinion and said rack;

a control arrangement for controlling the servomotor of the rack-and-pinion steering system, wherein said limited rotation of said rack relative to its longitudinal axis actuates said control arrangement;

further comprising a lever coupled to said rack in a substantially non-rotatable manner relative to the longitudinal axis of said rack;

further comprising a push element for pressing said rack against said pinion;

wherein said lever has a plane surface which is pressed against a further plan surface on said rack by said push element, said further plane surface being arranged on an opposite side of the toothing of the rack; and wherein in a region of said push element, said lever has arranged thereon a lateral extension having a cross-section in the form of a circular segment which is continued by side flanks of said rack having a shape of an arc of a circle, and wherein said push element includes a bearing bed having a concave circular arc shape for rotation about the longitudinal axis of said rack, said lateral extension and said rack being conjointly mounted on the bearing bed.

5. A rack-and-pinion steering system according to claim 3, wherein said push element is arranged opposite said pinion on a side of said rack remote from said pinion.

6. A rack-and-pinion steering system according to claim 4, wherein said push element is arranged opposite said pinion on a side of said rack remote from said pinion.

7. A servo-assisted rack-and-pinion steering system, comprising:

a helical-toothed pinion;

a helical-toothed rack engaging with said pinion, said rack rotating relative to its longitudinal axis in dependence on forces transmitted between said pinion and said rack;

a control arrangement actuated by said rotation of said rack, said control arrangement controlling a servo of said servo-assisted rack-and-pinion steering system.

* * * * *